United States Patent
Hur

(10) Patent No.: US 8,862,708 B2
(45) Date of Patent: Oct. 14, 2014

(54) METHOD AND APPARATUS FOR SYNCHRONIZING INFORMATION BETWEEN PLATFORMS IN A PORTABLE TERMINAL BASED ON A MULTI-SOFTWARE PLATFORM

(75) Inventor: Kang-Ho Hur, Seoul (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 13/415,237

(22) Filed: Mar. 8, 2012

(65) Prior Publication Data

US 2012/0233301 A1  Sep. 13, 2012

(30) Foreign Application Priority Data

Mar. 8, 2011  (KR) ........................ 10-2011-0020287

(51) Int. Cl.
*G06F 15/177* (2006.01)
*G06F 9/445* (2006.01)

(52) U.S. Cl.
CPC .......... *G06F 15/177* (2013.01); *G06F 9/44505* (2013.01)

USPC ........................................... 709/221; 719/319

(58) Field of Classification Search
USPC ................................... 709/221, 200; 719/319
See application file for complete search history.

(56) References Cited

U.S. PATENT DOCUMENTS

| | | | |
|---|---|---|---|
| 2005/0246612 A1* | 11/2005 | Leis et al. ..................... | 714/763 |
| 2011/0247016 A1* | 10/2011 | Seong ........................... | 719/328 |
| 2012/0173741 A1* | 7/2012 | Brittain et al. ................ | 709/228 |
| 2012/0221844 A1* | 8/2012 | Cross et al. ................... | 713/100 |

* cited by examiner

*Primary Examiner* — El Hadji Sall
(74) *Attorney, Agent, or Firm* — The Farrell Law Firm, P.C.

(57) ABSTRACT

A method of synchronizing information between platforms in a portable terminal based on a multi-software platform is provided. The method includes verifying that a first software platform is changed to a second software platform; and if the first software platform is changed to the second software platform, defining volume information of the changed second software platform with reference to volume information of the first software platform.

14 Claims, 5 Drawing Sheets

- VOLUME INFORMATION TABLE OF A PLATFORM

| TYPE | MIN | MAX | CURRENT | DEFAULT |
|---|---|---|---|---|
| CALL | 0 | 10 | 3 | 5 |
| MEDIA | 0 | 15 | 8 | 10 |
| RING TONE | 0 | 5 | 2 | 1 |
| ALRAN | 0 | 5 | 3 | 1 |
| ... | ... | ... | ... | ... |

SYNCHRONIZING

- VOLUME INFORMATION TABLE OF B PLATFORM

| TYPE | MIN | MAX | CURRENT | DEFAULT |
|---|---|---|---|---|
| NOTI | 0 | 5 | 3 | 3 |
| KEY TONE | 0 | 10 | 2 | 5 |
| CALL | 0 | 7 | 1 | 3 |
| MUSIC | 0 | 7 | 6 | 3 |
| ... | ... | ... | ... | ... |

METHOD AND APPARATUS FOR SYNCHRONIZING INFORMATION BETWEEN PLATFORMS IN A PORTABLE TERMINAL BASED ON A MULTI-SOFTWARE PLATFORM

PRIORITY

This application claims priority under 35 U.S.C. §119(a) to a Korean patent application filed in the Korean Intellectual Property Office on Mar. 8, 2011 and assigned Serial No. 10-2011-0020287, the entire disclosure of which is incorporated herein by reference.

BACKGROUND OF THE INVENTION

1. Field of the Invention

The present invention relates generally to a portable terminal based on a multi-software platform, and more particularly, to a method and apparatus for synchronizing volume information between platforms and providing a consistent volume to a user although a platform is changed.

2. Description of the Related Art

Portable terminals such as mobile terminals, electronic schedulers, and Personal Digital Assistants (PDA) have become necessities in modern society based on the development of the electronic communication industry. Portable terminals have become important means of information transmission, and are quickly changing.

Some communication in the mobile market is currently data service based. Accordingly, in mobile terminals, there are software platforms capable of providing a variety of application services similar to a desktop environment. A software platform is a software package including an operating system, middleware, and a basic application, which is mounted on a mobile terminal and controls a variety of application services.

Terminals, each of which provides a multi-software platform, are being gradually mass-produced. Accordingly, a user may also encounter a variety of platform environments using one terminal. However, when a platform is changed, the changed environment may be inconvenient to the user. For example, if a platform is changed and sound types used in a changed platform are different from the sound types in a platform before the change, the sound types that are inconsistent between the platforms may be provided to the user. It is assumed that there is a portable terminal that changes software platform A and software platform B in the same runtime. If both software platform A and software platform B maintain volume information independently, the user may receive a volume that is inconsistent when a platform is changed.

SUMMARY OF THE INVENTION

An aspect of the present invention is to solve at least the above-mentioned problems and/or disadvantages and to provide at least the advantages described below. Accordingly, an aspect of the present invention is to provide a method and apparatus for providing a consistent volume to a user when a platform is changed in a portable terminal based on a multi-software platform.

Another aspect of the present invention is to provide a method and apparatus for synchronizing volume information between platforms in a portable terminal based on a multi-software platform.

In accordance with an aspect of the present invention, a method of synchronizing information between platforms in a portable terminal based on a multi-software platform is provided. The method includes verifying that a first software platform is changed to a second software platform; and if the first software platform is changed to the second software platform, defining volume information of the changed second software platform with reference to volume information of the first software platform.

In accordance with another aspect of the present invention, a method of synchronizing information between platforms in a portable terminal based on a multi-software platform is provided. The method includes verifying that volume information of a first software platform which is being driven is changed; and if the volume information of the first software platform which is being driven is changed, defining volume information of a second software platform which is not being controlled with reference to the changed volume information of the first software platform using a background operation.

In accordance with another aspect of the present invention, an apparatus for synchronizing information between platforms in a portable terminal based on a multi-software platform is provided. The apparatus includes an input unit for receiving input; an output unit for outputting audio or video output; a storage unit for storing data; a communication unit for performing communication; and a controller for verifying that a first software platform is changed to a second software platform and defining volume information of the changed second software platform with reference to volume information of the first software platform.

In accordance with another aspect of the present invention, an apparatus for synchronizing information between platforms in a portable terminal based on a multi-software platform is provided. The apparatus includes an input unit for input; an output unit for audio or video output; a storage unit for storing data; a communication unit for performing communication; and a controller for verifying that volume information of a first software platform which is being controlled is changed and defining volume information of a second software platform which is not being controlled with reference to the changed volume information of the first software platform using a background operation.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Embodiments of the present invention will be described herein below with reference to the accompanying drawings.

In the following description, well-known functions or constructions are not described in detail since they would obscure the invention in unnecessary detail. Also, the terms used herein are defined according to the functions of the present invention. Thus, the terms may vary depending on a user's or operator's intension and usage. That is, the terms used herein must be understood based on the descriptions made herein.

The present invention described hereinafter relates to a portable terminal based on a multi-software platform. Specifically, the present invention relates to a method and apparatus for synchronizing volume information between platforms and providing a consistent volume to a user although a platform is changed.

Figure 1:
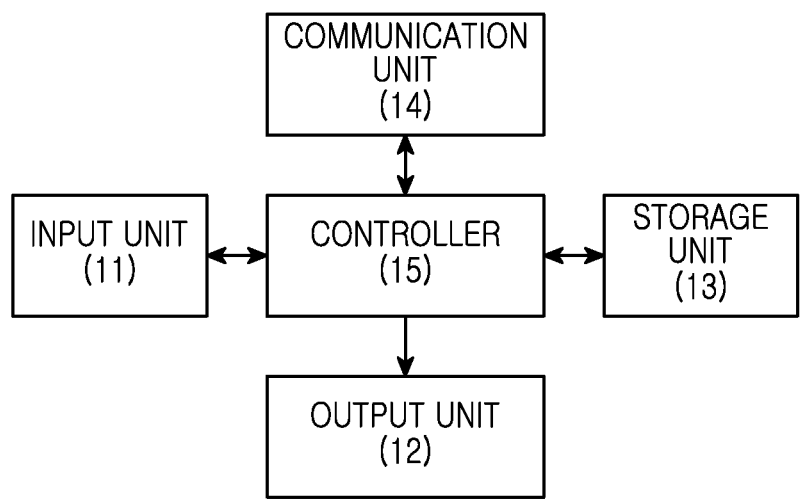
FIG. 1 is a block diagram illustrating a portable terminal according to one embodiment of the present invention.

FIG. 1 is a block diagram of a portable terminal according to an embodiment of the present invention.

Referring to FIG. 1, the portable terminal according to an embodiment of the present invention includes an input unit 11 for input, an output unit 12 for audio and video output, a storage unit 13 for storing data, a communication unit 14 for performing communication, and a controller 15 for controlling the overall operation. The output unit 12 includes an output means for visible display (not shown) and output means for audible output (not shown). A touch-sensitive display may be used for the output means for visible display. The touch-sensitive display may be a touch screen. Also, the touch-sensitive display output means for visible display may also be used as the input unit 11.

The input unit 11 outputs an input signal to the controller 15. The output unit 12 receives and displays display data corresponding to the input signal based on the control of the controller 15. The storage unit 13 stores a certain program for controlling an overall operation of the portable terminal and a variety of data input and output when a control operation of the portable terminal is performed. Specifically, the storage unit 13 stores information about at least two software platforms. The method of the present invention described below may be stored as instructions in one or more software modules. The module may be stored in the storage unit 13. The storage unit 13 may be a memory. If a change signal to a different software platform is received from the input unit 11, the controller 15 loads and controls the corresponding software platform from the storage unit 13.

Particularly, the controller 15 according to one embodiment of the present invention performs a control operation to synchronize volume information between software platforms (platforms) and provide a consistent volume although a platform is changed. Hereinafter, a method of synchronizing information between platforms based on a multi-software platform in the controller 15 will be described in detail with reference to drawings.

Figure 2:
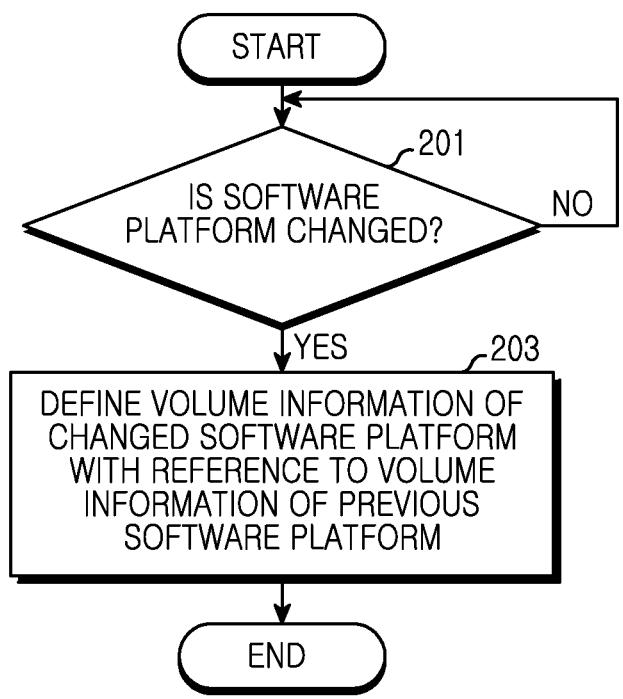
FIG. 2 is a flowchart illustrating a process of synchronizing volume information between platforms in a portable terminal that provides a multi-software platform according to one embodiment of the present invention.

FIG. 2 is a flowchart illustrating a process of synchronizing volume information between platforms in a portable terminal that provides a multi-software platform according to one embodiment of the present invention. Throughout the specification, volume information means sound information. Therefore, volume types mean types of sound.

Referring to FIG. 2, in step 201, the controller 15 verifies whether a platform is changed. If the platform is changed, the controller 15 defines volume information of the changed platform with reference to volume information of a previous platform. That is, the volume information of the previous platform when the previous platform is changed to another platform is used to define the volume information of the changed platform.

The platform includes volume (sound) information in which a number of sound types are defined for covering the sounds. For example, one platform includes five (5) sound types such as 'Ring tone', 'Music', 'Call', 'Alarm', 'Notification', and another platform includes four (4) sound types such as 'key tone', 'Media', 'Call', and 'system'.

Figure 5:
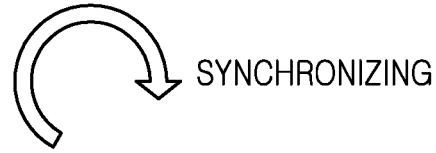
FIG. 5 is a table illustrating volume information of two software platforms according to one embodiment of the present invention.

For example, if a user changes the sound level such as a bell and an alarm while using the previous platform, the controller 15 updates the volume information of the previous platform. If the platform is changed, the controller 15 defines the volume information of the changed platform with reference to the volume information of the previous platform. The volume (sound) information includes information about a volume (sound) type (e.g., a bell, an alarm, and the like), a sound level adjustment range for each volume type, a currently set sound level for each volume type, and the like. However, volume types and sound level adjustment ranges for each volume type that are provided from two platforms may differ. FIG. 5 illustrates a table about volume information of two software platforms according to an embodiment of the present invention. Referring to FIG. 5, platform A and platform B have different volume types and different sound level adjustment ranges for each volume type.

Accordingly, the controller 15 searches a similar volume type (sound type) from volume information defined in the two platforms. The volume (sound) types are similar if the sound types are for similar sound. For example, the controller 15 determines that a MEDIA volume type of volume information defined in the A platform and a MUSIC volume type of volume information defined in the B platform are similar or the same. However, a volume type (sound type) which is similar to or the same as a corresponding volume type of the volume information of the A platform may not be searched from the volume information of platform B, controller 15 ignores it or may replace it with a corresponding default volume type and may select the corresponding default volume type. Additionally, controller 15 may define an optimized sound level of a corresponding volume type of a changed platform B using the following formula because a sound level adjustment range differs although a similar volume type is searched.

Sound level of corresponding volume type of B platform= (current sound level of corresponding volume type of A platform)×(maximum sound level of corresponding volume type of B platform÷maximum sound level of corresponding volume type of A platform)

That is, controller 15 selects a volume type which is similar to or the same as an nth volume type of the volume information defined in the A platform from the volume information defined in the B platform. For example, volume type (sound type) 'Music' in one platform including five (5) sound types such as 'Ring tone', 'Music', 'Call', 'Alarm', and 'Notification' is selected as a similar volume type (sound type) to 'Media' in another platform including four (4) sound types such as 'key tone', 'Media', 'Call', and 'system'.

The controller 15 defines volume information of the B platform in which a sound level of the selected volume type is set to correspond to percentage of a set sound level of the nth volume type of the A platform in an adjustment range.

Figure 3:
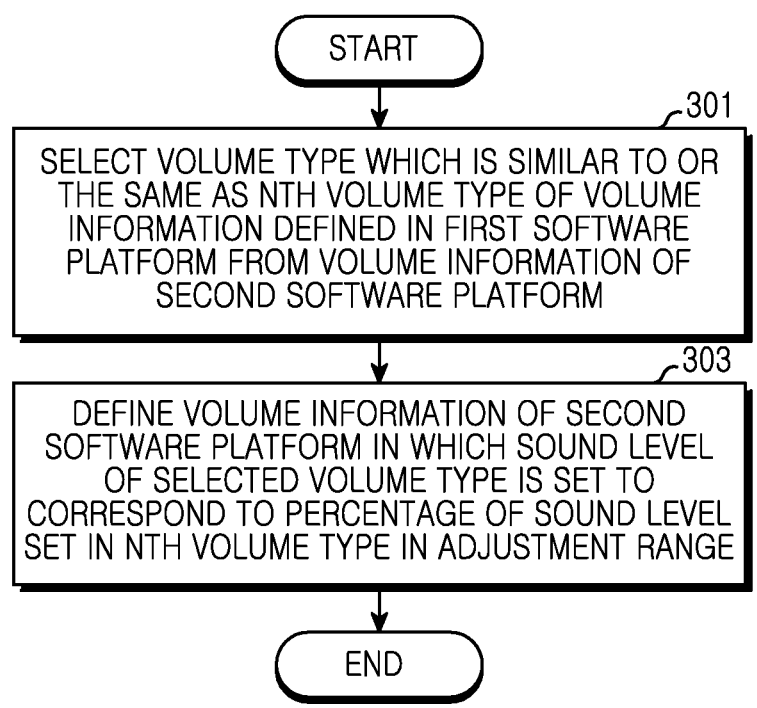
FIG. 3 is a flowchart illustrating a process of updating volume information of a software platform according to one embodiment of the present invention.

FIG. 3 is a flowchart illustrating a process of updating volume information of a software platform according to one embodiment of the present invention.

In step 301, controller 15 selects a volume type that is similar to or the same as an nth volume type of volume information defined in a first platform from volume information of a second platform.

In step, 303, the controller 15 defines volume information of the second platform in which a sound level of the selected volume type is set to correspond to percentage of a sound level set in the nth volume type in an adjustment range.

Figure 4:
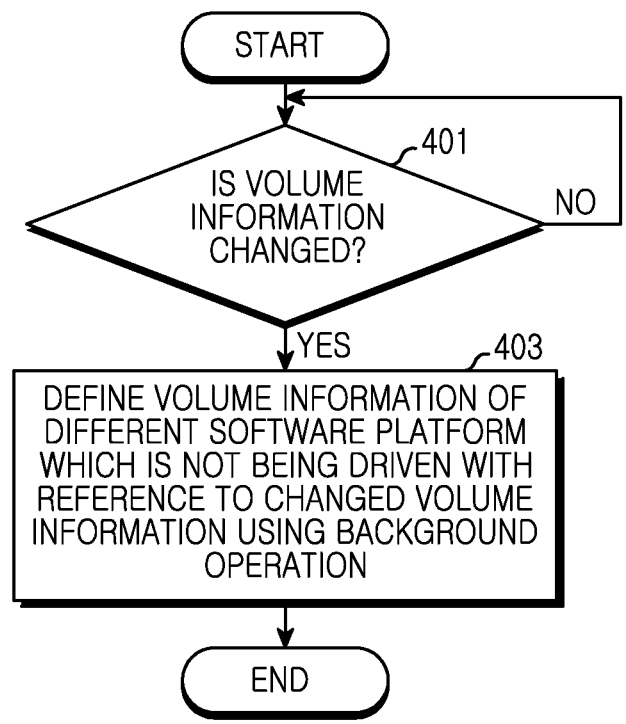
FIG. 4 is a flowchart illustrating a process of synchronizing volume information between platforms in a portable terminal which provides a multi-software platform according to one embodiment of the present invention.

FIG. 4 is a flowchart illustrating a process of synchronizing volume information between platforms in a portable terminal that provides a multi-software platform according to one embodiment of the present invention.

Referring to FIG. 4, in step 401, controller 15 verifies whether volume information is changed in a platform which is currently being controlled. In step 403, if the volume information is changed in the platform which is currently being controlled, controller 15 defines volume information of a different platform with reference to the changed volume information using a background operation. In FIG. 2, if a platform is changed, controller 15 defines volume information of the changed platform with reference to volume information of a previous platform. In FIG. 4, controller 15 simultaneously defines volume information of a different platform that is not being controlled with reference to changed volume information in a platform that is being controlled whenever the volume information of the platform which is being controlled is changed. That is, the process of FIG. 2 may be more advantageous than that of FIG. 4 because controller 15 in FIG. 2 defines the volume information of the changed platform with reference to volume information defined in the previous platform only once. Also, as described above, controller 15 may update volume information of a platform, which is not being controlled, according to the process of FIG. 3.

Thus, embodiments of the present invention may provide a consistent volume although a platform is changed in a portable terminal based on a multi-software platform to satisfy a user. Embodiments of the present invention also include computer-readable recording mediums having computer-executable instructions for performing the above-described methods according to embodiments of the present invention.

While the present invention has been particularly shown and described with reference to embodiments thereof, it will be understood by those skilled in the art that various changes in form and details may be made therein without departing from the spirit and scope of the present invention as defined by the appended claims and their equivalents.

What is claimed is:

1. A method of synchronizing information between platforms in a portable terminal based on a multi-software platform, the method comprising:
    verifying that a first software platform is changed to a second software platform; and
    if the first software platform is changed to the second software platform, defining sound information of the changed second software platform with reference to sound information of audio output settings defined in the first software platform.

2. The method of claim 1, wherein defining the sound information comprises:
    selecting a sound type similar to or the same as an nth sound type of the sound information defined in the first software platform from the sound information of the second software platform; and
    defining the sound information of the second software platform in which a level of the selected sound type is set to correspond to percentage of a sound level set in the nth sound type in an adjustment range.

3. A method of synchronizing information between platforms in a portable terminal based on a multi-software platform, the method comprising:
    verifying that sound information of audio output settings defined in a first software platform which is being driven is changed; and
    if the sound information of the first software platform which is being driven is changed, defining sound information of a second software platform which is not being controlled with reference to the changed sound information of the first software platform using a background operation.

4. The method of claim 3, wherein defining the sound information comprises:
    verifying an nth sound type whose sound level is changed from the sound information of the first software platform;
    selecting a sound type which is similar to or the same as the nth sound type from the sound information of the second software platform; and
    defining the second platform in which a sound level of the selected sound type is set to correspond to percentage of the changed sound level of the nth sound type in an adjustment range.

5. An apparatus for synchronizing information between platforms in a portable terminal based on a multi-software platform, the apparatus comprising:
    a storage unit for storing data;
    a communication unit for performing communication; and
    a controller for verifying that a first software platform is changed to a second software platform and defining sound information of the changed second software platform with reference to sound information of audio output settings defined in the first software platform.

6. The apparatus of claim 5, wherein the controller selects a sound type which is similar to or the same as an nth sound type of the sound information defined in the first software platform from the sound information of the second software platform and defines the sound information of the second software platform in which a sound level of the selected sound type is set to correspond to percentage of a sound level set in the nth sound type in an adjustment range.

7. An apparatus for synchronizing information between platforms in a portable terminal based on a multi-software platform, the apparatus comprising:
    a storage unit for storing data;
    a communication unit for performing communication; and
    a controller for verifying that sound information of audio output settings defined in a first software platform which is being controlled is changed and defining sound information of a second software platform which is not being controlled with reference to the changed sound information of the first software platform using a background operation.

8. The apparatus of claim 7, wherein the controller verifies an nth sound type whose sound level is changed from the sound information of the first software platform, selects a sound type which is similar to or the same as the nth sound type from the sound information of the second software platform, and defines the second platform in which a sound level of the selected sound type is set to correspond to percentage of the changed sound level of the nth sound type in an adjustment range.

9. A portable terminal for selecting desired portions of content, the terminal comprising:
    a storage unit;
    a controller;
    a module stored in the storage unit and configured for execution by the processor, the module including instructions;
    to determine that a first software platform is changed to a second software platform; and if the first software platform is changed to the second software platform, to define sound information of the changed second software platform with reference to sound information of audio output settings defined in the first software platform.

10. The portable terminal of claim 9, wherein the module further includes instructions to select a sound type similar to or the same as an nth sound type of the sound information defined in the first software platform from the sound information of the second software platform, and to define the sound information of the second software platform in which a level of the selected sound type is set to correspond to percentage of a sound level set in the nth sound type in an adjustment range is further included.

11. A portable terminal for selecting desired portions of content, the terminal comprising:
   a storage unit;
   a controller;
   a module stored in the storage unit and configured for execution by the processor, the module including instructions;
   to determine that sound information of audio output settings defined in a first software platform which is being driven is changed; and
   if the sound information of the first software platform which is being driven is changed, to define sound information of a second software platform which is not being controlled with reference to the changed sound information of the first software platform using a background operation.

12. The portable terminal of claim 11, wherein the module further includes instructions to select a sound type which is similar to or the same as the nth sound type from the sound information of the second software platform, and define the second platform in which a sound level of the selected sound type is set to correspond to percentage of the changed sound level of the nth sound type in an adjustment range is further included.

13. A non-transitory computer-readable medium having computer-executable instructions for performing a method, the method comprising:
   determining that a first software platform is changed to a second software platform; and
   if the first software platform is changed to the second software platform, defining sound information of the changed second software platform with reference to sound information of audio output settings defined in the first software platform.

14. A non-transitory computer-readable medium having computer-executable instructions for performing a method executed by a portable electronic device with a touch-sensitive display, the method comprising:
   determining that sound information of audio output settings defined in a first software platform which is being driven is changed; and
   if the sound information of the first software platform which is being driven is changed, defining sound information of a second software platform which is not being controlled with reference to the changed sound information of the first software platform using a background operation.

* * * * *